United States Patent [19]
Brewer

[11] 3,924,716
[45] Dec. 9, 1975

[54] VISCOUS FLUID CLUTCH WITH CENTRIFUGAL CLUTCH

[75] Inventor: Robert W. Brewer, Dayton, Ohio

[73] Assignee: General Motors Corporation, Detroit, Mich.

[22] Filed: Nov. 21, 1973

[21] Appl. No.: 417,751

[52] U.S. Cl. .............. 192/57; 192/58 B; 192/82 T; 192/104 C
[51] Int. Cl... F16d 25/00; F16d 43/18; F16d 43/30
[58] Field of Search ...... 192/57, 82 T, 104 C, 58 B, 192/48.3, 48.5, 48.7

[56] References Cited
UNITED STATES PATENTS

| 2,607,327 | 8/1952 | Lee | 192/104 C X |
| 3,522,795 | 8/1970 | Seifert | 192/104 C |
| 3,552,532 | 1/1971 | Thomas et al. | 192/58 B |
| 3,587,801 | 6/1971 | Riner | 192/82 T X |

Primary Examiner—Samuel Scott
Assistant Examiner—John Reep
Attorney, Agent, or Firm—John P. Moran

[57] ABSTRACT

A clutch including conventional viscous fluid shear drive means and a centrifugal clutch operable between the housing and enclosed clutch plate to maintain a substantially nonslip drive relationship therebetween, effectuating high fan speed at low engine rpms or idle conditions.

5 Claims, 3 Drawing Figures

VISCOUS FLUID CLUTCH WITH CENTRIFUGAL CLUTCH

This invention relates generally to viscous fluid clutches and, more particularly, to a viscous fluid clutch having centrifugal clutch means associated therewith.

In some vehicular engine applications it is highly beneficial to have the engine cooling fan operating at full capacity during idle or low engine rpm conditions to increase the time period that it would take to overheat the engine when the vehicle is stopped. This can be accomplished by incorporating springloaded drive means in a viscous fluid clutch, operable between the driving and driven elements at relatively low input speeds. U.S. Pat. No. 2,963,135 Weir discloses one means for accomplishing such a result in a fluid coupling, i.e., by incorporating therein a drive plate formed of relatively thin metal stock having some resiliency and being radially slotted to provide a series of spaced fingers which alternately extend in opposite directions out of the plane of the drive plate.

An object of this invention is to provide an improved viscous fluid clutch including centrifugal clutch means for providing a substantially nonslip or 1:1 drive relationship between the relatively rotatable housing and enclosed clutch plate until a predetermined output or fan speed, say, 1250 rpm, has been reached, after which the conventional viscous shear drive characteristics become operable in the usual manner.

Another object of the invention is to provide a viscous fluid clutch including a centrifugal clutch operable between the clutch housing and the hub portion of the conventional enclosed clutch plate in a chamber of the housing adjacent the shear drive operating chamber.

A further object of the invention is to provide a viscous fluid clutch including a conventional annular working chamber and an adjacent smaller annular chamber, with the hub of the conventional clutch plate mounted on a shaft at the center of the smaller chamber and extending substantially radially outwardly therefrom into the annular working chamber in viscous shear drive relationship therewith, and a centrifugal clutch operatively mounted in the second chamber between the housing and the hub of the clutch plate, the centrifugal clutch including a flange portion secured to the housing at the outer periphery of the second chamber, arcuate-shaped centrifugal weights pivotally mounted on the flange portion, resilient means for interconnecting adjacent ends of the centrifugal weights, and a suitable clutch shoe secured to the inner peripheral surface of each of the centrifugal weights, the resilient means urging the clutch shoes into contact with the outer surface of the clutch plate hub.

These and other objects and advantages of the invention will be apparent when reference is made to the following description and accompanying drawings, wherein.

Figure 1:
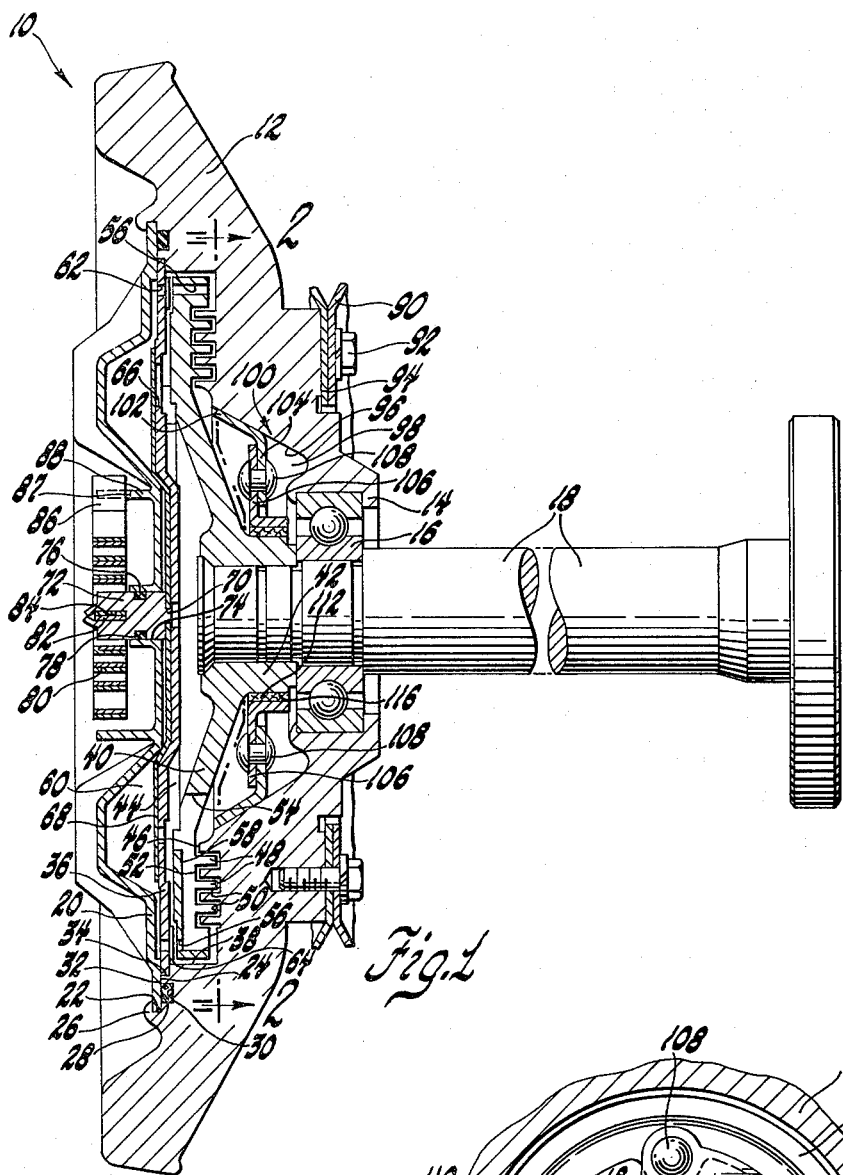
FIG. 1 is a cross-sectional view of a viscous fluid clutch embodying the invention.

Referring to the drawings in greater detail, FIG. 1 illustrates a viscous fluid clutch 10 including a housing or output member 12 having a hub 14 which is rotatably mounted by a suitable bearing 16 on a drive shaft 18. A contoured cover member 20 is mounted in an annular recess 22 formed in a face of the housing 12. The cover member 20 is formed to include an annular flat surface 24 adjacent its outer peripheral edge, the latter being confined by an annular lip 26 of the housing 12 in the annular recess 22. A seal 28 is compressed by the flat surface 24 of the cover member 20 in an annular groove 30 formed in the bottom surface 32 of the recess 22.

A second annular recess 34 is formed in the housing 12 radially inward of the outer periphery of the annular recess 22. A divider wall 36 is confined adjacent its outer edge in the second recess 34 by the cover member 20. A third annular deeper recess 38 is formed in the housing 12 radially inward of the second annular recess 34. A clutch plate 40 is secured at a center hub 42 thereof by any suitable means to the drive shaft 18, the outer peripheral portion of the clutch plate 40 being freely located in the operating or working chamber 44 provided by the formation of the third annular recess 38.

Adjacent portions of the clutch plate 40 and the rear wall or bottom surface 46 of the third annular recess 38 are formed to include cooperating annular ridges and grooves 48 and 50, respectively, with an intervening fluid shear space 52 therebetween to accommodate a viscous fluid, such as silicone fluid, serving as a torque-transmitting medium.

The clutch plate 40 further includes a plurality of equispaced openings 54 formed therein at a point radially inward from the ridge and groove elements 48 and 50. A pair of oppositely disposed smaller openings 56 are formed in the clutch plate 40 adjacent the outermost edge thereof, one of which is illustrated as being radially aligned with one of the larger openings 54, but such need not be the case. A pair of radial V-shaped grooves, such as grooves 58, are formed in the clutch plate 40 across the ridges 48 and terminating at the openings 56. The grooves 58 assist in the process of removing the fluid medium from the working chamber 44.

The front wall or cover member 20 includes an annular bend intermediate the center and peripheral edges thereof which forms an annular reservoir 60 with the divider wall 36. One or more pump outlet openings 62 are formed through the divider wall 36 circumferentially adjacent pump or dam elements 64 formed on the divider wall 36, and at substantially the same radial distance from the center of the clutch 10 as the outer clutch plate openings 56. The pump outlet openings 62 communicate between the working chamber 44 and the annular reservoir 60 and are substantially the same diameter as the clutch plate openings 56. The pump or dam elements 64 serve as wipers which force the fluid medium to flow from the working chamber 44 through the respective pump outlet openings 62 into the annular reservoir 60, in the well-known manner. The elements 64 may consist of a circular boss formed on the divider wall 36 by any suitable means, such as stamping, or it may be a rectangular-shaped or other-shaped member secured to the divider wall 36, such as by welding. It is to be understood that, in some applications, one outlet and one pump element may be sufficient, while other applications may require two such pumping arrangements. In the latter instance, one of the outlet openings 62 may at times be closed by an internal bimetallic valve (not shown).

One or more inlet ports 66 are also formed in the divider wall 36, communicating between the reservoir 60 and the working chamber 44 radially inward of the pump elements 64 and the pump outlet openings 62. The inlet port 66 is at times closed off by a valve member 68, which may be responsive to temperature changes or to centrifugal force. The valve member 68 is illustrated as being secured in any suitable manner to a reduced-diameter portion 70 of a center pin or shaft 72, which is rotatably mounted in a central opening 74 formed in the front wall or cover member 20. A seal ring 76 may be mounted in an annular groove 78 formed in the pin 72 within the central opening 74 to prevent leakage therepast. A hellically wound, bimetallic thermostatic valve control element 80 is provided with an inwardly extending end-portion 82 which is mounted in a transverse slot 84 formed in the pin 72. An outwardly extending end-portion 86 of the bimetallic element 80 is restrained by virtue of being inserted in a slot 87 formed in a post 88. With this arrangement, a change in ambient temperature either winds or unwinds the bimetallic element 80, resulting in rotation of the pin 72 and the valve member 68, to thus control the flow of fluid medium from the reservoir 60 through the inlet port 66 to the working chamber 44 in the well-known manner.

As is well known to those skilled in the fluid clutch art, normally, upon rotation of the clutch plate 40 by the input shaft 18, torque is transmitted to the adjacent housing or output member 12 by the shear action of the fluid medium in the operating chamber 44. Rotation of the output member or housing 12 effects rotation of a cooling fan 90 secured by bolts 92 to a mounting surface 94 formed on the housing 12, the speed thereof being determined by the volume of fluid medium in the chamber 44.

Figure 2:
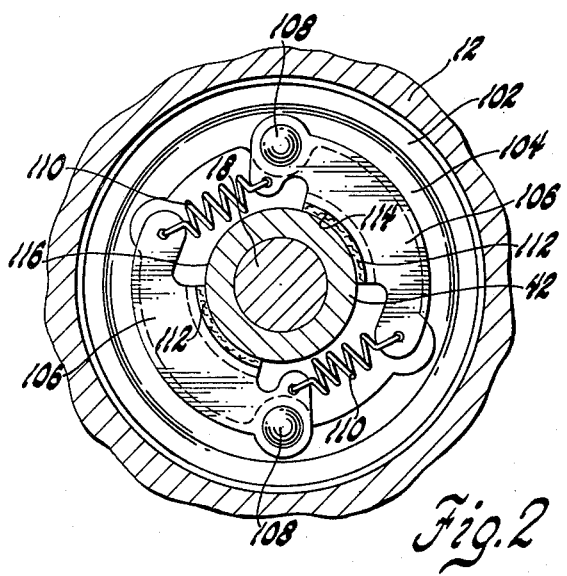
FIG. 2 is a fragmentary cross-sectional view taken along the plane of line 2—2 of FIG. 1, and looking in the direction of the arrows.

A conically shaped surface 96 is formed in the housing 12 radially outward of the hub 42 of the clutch plate 40, producing an annular chamber 98 therebetween. A centrifugal clutch 100 is operatively mounted in the chamber 98, the centrifugal clutch 100 including an outer conical wall portion 102 which is secured in any suitable manner to the conically shaped surface 96. An inwardly extending radial flange 104 is formed on the smaller-diameter end of the conical wall portion 102. A pair of centrifugal weights 106 (FIG. 2) are pivotally mounted by pivot pins 108 on the radial flange 104. A pair of springs 110 (FIG. 2) are connected between respective adjacent ends of the centrifugal weights 106, urging clutch shoes 112, secured to the respective inner peripheral surfaces 114 of the centrifugal weights 106, into contact with the outer surface 116 of the clutch plate hub 42.

In operation, it may be realized that at low engine speed or idle conditions, the clutch plate 40 and the housing 12 will be frictionally connected by virtue of the shoes 112 of the centrifugal clutch 100 engaging the clutch plate hub 42. Once a predetermined output or fan speed not otherwise obtainable via fluid shear drive at the low speed conditions, say, 1250 rpm, has been reached, centrifugal force will have caused the centrifugal weights 106 to pivot outwardly against the force of the springs 110, thereby progressively releasing the clutch shoes 112 from the hub 42. This, of course, will permit torque transfer by the conventional viscous fluid shear drive in the ridge-and-groove shear space 52 to become operable for higher input speeds in the usual manner described above.

It should be apparent that the invention provides an improved viscous fluid clutch including the usual shear drive arrangement along with efficient and compact centrifugal clutch means for assuring a high fan speed until a predetermined output speed is reached, thus, increasing the time period that it would take to overheat the engine when the vehicle is stopped.

Figure 3:
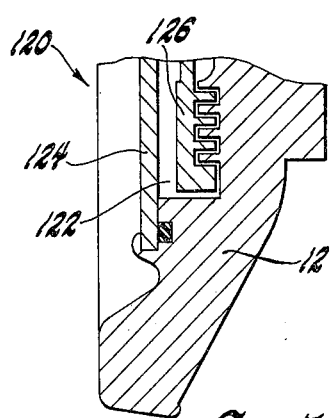
FIG. 3 is a fragmentary cross-sectional view of a viscous fluid coupling embodying the invention.

It should also be realized that, while a working chamber and adjacent reservoir chamber, with pump means and valve means operable therebetween have been illustrated and described, the centrifugal clutch arrangement shown in FIG. 1 could be associated with the viscous fluid coupling 120 illustrated in FIG. 3, including only a working chamber 122 formed between the housing 12 and a flat cover member 124 and which retains the viscous fluid at all times, providing a slipping-type coupling for variably limiting the torque transfer between the engine and the fan with speed changes. If desired, the clutch plate 126 could be formed to include flat parallel faces with a predetermined shear space on both sides thereof, without the benefit of the cooperative ridges and grooves illustrated.

It should also be apparent that, should there be a need, for example, for accessory drive applications other than cooling fans, the centrifugal clutch arrangement of the invention could be included in a viscous fluid clutch or coupling wherein the input and output means are reversed, i.e., wherein the housing serves as the input member by virtue of associated pulley means, and the central shaft serves as the output member.

While but one general embodiment of the invention has been shown and described, other modifications thereof are possible.

I claim:

1. A viscous fluid clutch comprising external and internal relatively rotatable drive means, said external drive means being rotatably mounted by bearings on a central shaft extending into said external drive means and having first and second adjacent annular chambers formed therein, said internal drive means having a hub secured to the inner end of said central shaft and extending radially outwardly therefrom into said first annular chamber, a plurality of annular ridges formed on one of said external and internal drive means and a plurality of cooperating annular grooves formed on the other of said external and internal drive means in said first annular chamber, said annular ridges and grooves forming a shear space therebetween and operable with a fluid medium to provide a shear-type fluid drive between said external and internal drive means, a centrifugal clutch operatively connected in said second annular chamber between said external drive means and said hub of said internal drive means, said centrifugal clutch including flange means secured to said external drive means at the radial outer wall surface of said second annular chamber, a pair of oppositely disposed arcuate-shaped centrifugal weights pivotally mounted on said flange means, a clutch shoe secured to the inner peripheral surface of each of said centrifugal weights, and spring means operatively connected between said oppositely disposed centrifugal weights for urging said clutch shoes into contact with said hub of said internal drive means.

2. A viscous fluid clutch comprising first and second relatively rotatable drive means, said first drive means being rotatably mounted by bearings on a central shaft and having first and second adjacent annular chambers formed therein, said second chamber being smaller in diameter than said first chamber and having a conically shaped outer wall, the larger-diameter end of which opens into said first annular chamber, said second drive means having a hub secured to said central shaft within said scond chamber with the remainder of said second drive means extending substantially radially outwardly from said second chamber into said first chamber, a plurality of annular ridges formed on one of said first and second drive means and a plurality of cooperating annular grooves formed on the other of said first and second drive means in said first chamber, said annular ridges and grooves forming a shear space therebetween and operable with a fluid medium to provide a shear-type fluid drive between said first and second drive means, a centrifugal clutch operatively connected in said second chamber between said first drive means and said hub of said second drive means, said centrifugal clutch including an outer conical flange portion secured to said conically shaped outer wall of said second chamber, a radially inwardly extending flange formed on said outer conical flange portion, a pair of oppositely disposed arcuate-shaped centrifugal weights pivotally mounted on said inwardly extending flange, a clutch shoe secured to the inner peripheral surface of each of said centrifugal weights, and a pair of springs extending between respective adjacent ends of said oppositely disposed centrifugal weights for urging said clutch shoes into contact with said hub of said second drive means within said second chamber.

3. A viscous fluid clutch comprising a housing rotatably mounted by bearings on a central shaft and having first and second adjacent annular chambers formed therein, said second chamber being smaller in diameter than said first chamber and having a conically shaped outer wall, the larger-diameter end of which opens into said first annular chamber, a clutch plate enclosed by said housing and having a hub secured to said central shaft within said second chamber with the remainder of said clutch plate extending substantially radially outwardly from said second chamber into said first chamber, a plurality of annular ridges formed on one of said housing and said clutch plate and a plurality of cooperating annular grooves formed on the other of said housing and said clutch plate in said first chamber, said annular ridges and grooves forming a shear space therebetween and operable with a fluid medium to provide a shear-type fluid drive between said housing and said clutch plate, a centrifugal clutch operatively connected in said second chamber between said housing and said hub of said clutch plate, said centrifugal clutch including an outer conical flange portion secured to said conically shaped outer wall of said second chamber, a radially inwardly extending flange formed on said outer conical flange portion, a pair of oppositely disposed arcuate-shaped centrifugal weights pivotally mounted on said inwardly extending flange, a clutch shoe secured to the inner peripheral surface of each of said centrifugal weights, and a pair of springs extending between respective adjacent ends of said centrifugal weights for urging said clutch shoes into contact with said hub of said clutch plate.

4. A viscous fluid clutch comprising first and second relatively rotatable drive means, said first drive means being rotatably mounted by bearings on a central shaft and having first, second, and third adjacent annular chambers formed therein, said second chamber being smaller in diameter than said first chamber and having a conically shaped outer wall, the larger-diameter end of which opens into said first annular chamber, said second drive means having a hub secured to said central shaft within said second chamber with the remainder of said second drive means extending substantially radially outwardly from said second chamber into said first chamber, a plurality of annular ridges formed on one of said first and second drive means and a plurality of cooperating annular grooves formed on the other of said first and second drive means in said first chamber, said annular ridges and grooves forming a shear space therebetween and operable with a fluid medium to provide a shear-type fluid drive between said first and second drive means, said second chamber having outlet opening means at an outer portion and inlet opening means at an inner portion, pump means formed on one of said drive means to pump said fluid medium from said first chamber through said outlet opening means into said third chamber, temperature-responsive valve means operatively connected to said inlet opening means for controlling the flow of said fluid medium from said third chamber through said inlet opening means into said first chamber in response to changes in ambient temperature, a centrifugal clutch operatively connected in said second chamber between said first drive means and said hub of said second drive means, said centrifugal clutch including an outer conical flange portion secured to said conically shaped outer wall of said second chamber, a radially inwardly extending flange formed on said outer conical flange portion, a pair of oppositely disposed arcuate-shaped centrifugal weights pivotally mounted on said inwardly extending flange, a clutch shoe secured to the inner peripheral surface of each of said centrifugal weights, and a pair of springs extending between respective adjacent ends of said oppositely disposed centrifugal weights for urging said clutch shoes into contact with said hub of said second drive means within said second chamber.

5. A viscous fluid clutch comprising an enclosed housing rotatably mounted by bearings on a central shaft and having first, second, and third adjacent annular chambers formed therein, a divider wall sealed between said first and third chambers, said second chamber being smaller in diameter than said first chamber and having a conically shaped outer wall, the larger-diameter end of which opens into said first annular chamber at the side thereof opposite said divider wall, a clutch plate having a hub secured to said central shaft within said second chamber with the remainder of said clutch plate extending substantially radially outwardly from said second chamber into said first chamber, a plurality of annular ridges formed on one of said enclosed housing and said clutch plate and a plurality of cooperating annular grooves formed on the other of said enclosed housing and said clutch plate in said first chamber, said annular ridges and grooves forming a shear space therebetween and operable with a fluid medium to provide a shear-type fluid drive between said enclosed housing and said clutch plate, said divider wall having outlet opening means formed in an outer radial portion thereof and inlet opening means formed at an inner radial portion thereof, pump means formed on one of said divider wall and clutch plate to pump said fluid medium from said first chamber through said outlet opening means into said third chamber, temperature-responsive valve means operatively connected to said inlet opening means for controlling the flow of said fluid medium from said third chamber through said inlet opening means into said first chamber in response to changes in ambient temperature, a centrifugal clutch operatively connected in said second chamber between said housing and said hub of said clutch plate, said centrifugal clutch including an outer conical flange portion secured to said conically shaped outer wall of said second chamber, a radially inwardly extending flange formed on said outer conical flange portion, a pair of oppositely disposed arcuate-shaped centrifugal weights pivotally mounted on said inwardly extending flange, a clutch shoe secured to the inner peripheral surface of each of said centrifugal weights, and a pair of springs extending between respective adjacent ends of said oppositely disposed centrifugal weights for urging said clutch shoes into contact with said hub of said clutch plate, thereby effectuating a substantially nonslip drive connection between said clutch plate and said housing until a predetermined output speed is attained and said centrifugal weights pivot outwardly under the action of centrifugal force, permitting said shear-type fluid drive to become operable.

* * * * *